United States Patent
Mihai et al.

(10) Patent No.: US 10,559,216 B2
(45) Date of Patent: Feb. 11, 2020

(54) SYSTEMS AND METHODS FOR CONDUCTING ASSESSMENTS IN AN ELECTRONIC LEARNING SYSTEM

(71) Applicant: Desire2Learn Incorporated, Kitchener (CA)

(72) Inventors: Sebastian Mihai, Kitchener (CA); Phil McClelland, Kitchener (CA); Philip Brown, Kitchener (CA); Vladan Ignjatovic, Kitchener (CA)

(73) Assignee: D2L Corporation, Kitchener (CA)

( * ) Notice: Subject to any disclaimer, the term of this patent is extended or adjusted under 35 U.S.C. 154(b) by 54 days.

(21) Appl. No.: 14/060,586

(22) Filed: Oct. 22, 2013

(65) Prior Publication Data
US 2015/0111192 A1   Apr. 23, 2015

(51) Int. Cl.
   *G09B 7/06* (2006.01)
   *G09B 7/02* (2006.01)
   *G09B 5/00* (2006.01)

(52) U.S. Cl.
   CPC .............. *G09B 7/06* (2013.01); *G09B 7/02* (2013.01); *G09B 5/00* (2013.01)

(58) Field of Classification Search
   CPC ... G09B 7/00; G09B 7/08; G09B 7/02; G06Q 50/20; G06Q 50/205
   USPC ............... 434/362, 323, 322, 350, 353, 118
   See application file for complete search history.

(56) References Cited

U.S. PATENT DOCUMENTS

| | | | | |
|---|---|---|---|---|
| 5,140,564 A | * | 8/1992 | Rich | G04F 10/04 368/107 |
| 5,615,134 A | * | 3/1997 | Newsham et al. | 700/276 |
| 5,618,182 A | * | 4/1997 | Thomas | G09B 7/04 434/118 |
| 5,642,334 A | * | 6/1997 | Liberman | G04F 5/025 368/10 |
| 5,724,262 A | * | 3/1998 | Ghahramani | 702/186 |
| 5,796,681 A | * | 8/1998 | Aronzo | G04F 1/005 368/10 |
| 5,823,788 A | * | 10/1998 | Lemelson | G09B 7/04 273/432 |
| 6,042,383 A | * | 3/2000 | Herron | G09B 5/065 434/107 |
| 6,466,928 B1 | * | 10/2002 | Blasko | G06Q 10/06 706/46 |
| 6,471,521 B1 | * | 10/2002 | Dornbush | G09B 5/14 434/322 |
| 6,618,734 B1 | * | 9/2003 | Williams | G06Q 10/06 |

(Continued)

*Primary Examiner* — Robert J Utama
(74) *Attorney, Agent, or Firm* — Bereskin & Parr LLP/S.E.N.C.R.L., s.r.l.

(57) ABSTRACT

Systems and methods for conducting an electronic assessment in an electronic learning (eLearning) environment are provided. The system includes a display and at least one processor operatively coupled to the display. The at least one processor configured for: providing an electronic assessment comprising a plurality of assessment tasks for a current participant to complete within an allocated amount of assessment time; determining context-dependent time requirement (CDTR) value for at least one of the assessment tasks based upon historical performance data associated with that task, the CDTR value being indicative of a suggested amount of time required to complete that task; and providing the CDTR value to the current participant.

19 Claims, 9 Drawing Sheets

(56) References Cited

U.S. PATENT DOCUMENTS

| | | | | |
|---|---|---|---|---|
| 8,128,415 B2 * | 3/2012 | Rogers | G06Q 50/205 | 434/323 |
| 8,938,501 B2 * | 1/2015 | Patel | G06Q 10/10 | 709/203 |
| 9,892,650 B2 * | 2/2018 | Rogers | G09B 7/02 | |
| 2002/0128908 A1 * | 9/2002 | Levin | G06Q 30/02 | 705/14.53 |
| 2003/0044760 A1 * | 3/2003 | Banerjee | G09B 7/00 | 434/350 |
| 2003/0078804 A1 * | 4/2003 | Morrel-Samuels | G06Q 10/0639 | 705/7.42 |
| 2003/0105642 A1 * | 6/2003 | Andino, Jr. | G06Q 10/10 | 705/321 |
| 2003/0227479 A1 * | 12/2003 | Mizrahi et al. | 345/753 | |
| 2004/0008589 A1 * | 1/2004 | McMillan | G04F 1/005 | 368/223 |
| 2005/0053904 A1 * | 3/2005 | Shephard et al. | 434/236 | |
| 2005/0191609 A1 * | 9/2005 | Fadel | G09B 7/02 | 434/322 |
| 2006/0246411 A1 * | 11/2006 | Yang | 434/323 | |
| 2007/0299674 A1 * | 12/2007 | Timko | A61B 5/00 | 705/321 |
| 2008/0082931 A1 * | 4/2008 | Morrel-Samuels | G06F 17/243 | 715/765 |
| 2010/0068687 A1 * | 3/2010 | Bertelsen | G09B 7/02 | 434/322 |
| 2012/0256822 A1 * | 10/2012 | Coda | G09B 5/08 | 345/156 |
| 2014/0237371 A1 * | 8/2014 | Klemm | G06Q 10/109 | 715/730 |
| 2014/0272899 A1 * | 9/2014 | Nethercutt | G09B 7/02 | 434/353 |
| 2015/0050635 A1 * | 2/2015 | Hong | G09B 7/06 | 434/353 |

* cited by examiner

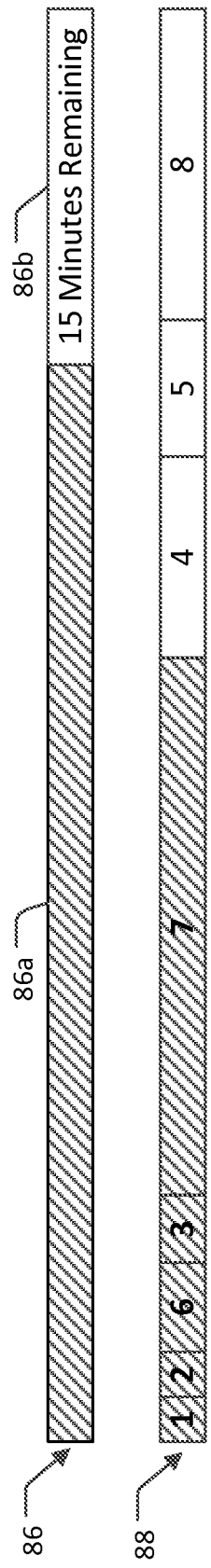
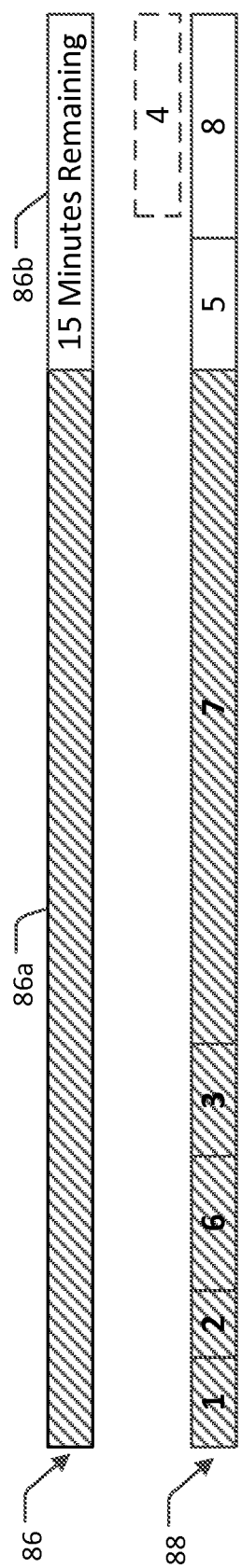
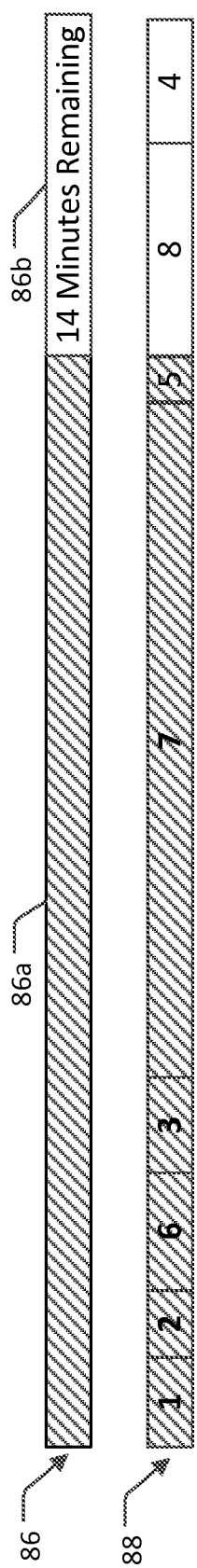
FIG. 8A
FIG. 8B
FIG. 8C

SYSTEMS AND METHODS FOR CONDUCTING ASSESSMENTS IN AN ELECTRONIC LEARNING SYSTEM

TECHNICAL FIELD

Embodiments herein relate to electronic learning systems, and in particular to systems and methods for conducting assessments in electronic learning systems.

INTRODUCTION

Electronic learning (also called "e-Learning" or "eLearning") generally refers to education or learning where users (e.g., learners, instructors, administrative staff) engage in education related activities using computers and other computing devices. For example, learners may enroll or participate in a course or program of study offered by an educational institution (e.g., a college, university or grade school) through a web interface that is accessible over the Internet. Similarly, learners may receive assignments electronically, participate in group work and projects by collaborating online, and be graded based on assignments and examinations that are submitted using an electronic dropbox.

Electronic learning is not limited to use by educational institutions, however, and may also be used in governments or in corporate environments. For example, employees at a regional branch office of a particular company may use electronic learning to participate in a training course offered by their company's head office without ever physically leaving the branch office.

Electronic learning can also be an individual activity with no institution driving the learning. For example, individuals may participate in self-directed study (e.g., studying an electronic textbook, or watching a recorded or live webcast of a lecture) that is not associated with a particular institution or organization.

Electronic learning often occurs without any physical interaction between the users in the educational community. Accordingly, electronic learning overcomes some of the geographic limitations associated with more traditional learning methods, and may eliminate or greatly reduce travel and relocation requirements imposed on users of educational services.

Furthermore, because course materials can be offered and consumed electronically, there are fewer physical restrictions on learning. For example, the number of learners that can be enrolled in a particular course may be practically limitless, as there may be no requirement for physical facilities to house the learners during lectures. Furthermore, learning materials (e.g., handouts, textbooks, and the like) may be provided in electronic formats so that they can be reproduced for a virtually unlimited number of learners. Finally, lectures may be recorded and accessed at varying times (e.g., at different times that are convenient for different users), thus accommodating users with varying schedules, and allowing users to be enrolled in multiple courses that might have a scheduling conflict when offered using traditional techniques.

Electronic learning systems may also provide assessment modules to assess the learners. For example, eLearning systems may provide tests, quizzes, examination, or other suitable assessment modules for the learners to participate in to assess their knowledge, skills, competencies and so on. The assessment modules may contain a plurality of assessment tasks. For example, the assessment modules may contain various combinations of multiple choice questions, true-or-false questions, short answer questions, long answer questions and so on.

The assessment module may be allocated an assessment time, which is an amount of time allocated for the learner to complete the assessment. For example, a short quiz that includes a handful of multiple choice questions may be allocated 10 minutes while a more in depth exam that includes multiple choice questions, short answer questions and long answer questions may be allocated 3 hours. The learner participating in the assessment module may attempt to answer as many questions as possible before the allocated time expires.

SUMMARY

According to some aspects, there is provided an electronic learning system for conducting an electronic assessment. The system includes a display, with at least one processor operatively coupled to the display. The at least one processor is configured for providing an electronic assessment comprising a plurality of assessment tasks for a current participant to complete within an allocated amount of assessment time, determining at least one context-dependent time requirement (CDTR) value for at least one of the assessment tasks based upon historical performance data associated with that task, the CDTR value being indicative of a suggested amount of time required to complete that task, and providing the CDTR value to the current participant.

In some aspects, the historical data for the at least one of the assessment tasks includes data indicative of the amount of time required for historical participants to complete that task and obtain a defined successful task value for that task.

In some aspects, the successful task value is defined automatically based upon the historical data.

In some aspects, the historical data for the at least one of the assessment tasks is historical data associated with similar historical participants.

In some aspects, the similar historical participants are identified based upon the academic performance of the current participant and historical participants in at least one other assessment module.

In some aspects, the CDTR value is adjusted based upon success rate of historical participants associated with the at least one of the assessment tasks, the success rate being indicative of a portion of historical participants who had obtained the successful task value for that task.

In some aspects, the CDTR value for a task k is determined according to: $CDTR(k)=(T(k))/(S(k))$ wherein $T(k)$ is the amount of time required for historical participants to complete that task and obtain a defined successful task value for that task, and $S(k)$ is the success rate for that task.

In some aspects, a normalized CDTR value is determined based upon the CDTR value and the assessment time.

In some aspects, the at least one processor is configured to provide a pace visualization including a visual representation of the CDTR value and the assessment time.

In some aspects, the at least one processor is further configured to determine a suggested order of performance for remaining tasks of the plurality of assessment tasks to optimize the participant's performance, the suggested order being determined based upon CDTR value and task value associated with the remaining tasks and remaining time of the assessment time.

According to other aspects, there is provided a method for conducting an electronic assessment. The method includes providing an electronic assessment that includes a plurality of assessment tasks for a current participant to complete within an allocated amount of assessment time, determining context-dependent time requirement (CDTR) value using at least one processor for at least one of the assessment tasks based upon historical performance data associated with that task, the CDTR value being indicative of a suggested amount of time required to complete that task, and providing the CDTR value to the current participant.

BRIEF DESCRIPTION OF THE DRAWINGS

Some embodiments will now be described, by way of example only, with reference to the following drawings, in which:

FIGS. 8A-8C are schematic diagrams illustrating an exemplary reordering of tasks based upon CDTR values that may be implemented by the system of FIG. 1.

DESCRIPTION OF SOME EMBODIMENTS

Generally, the goal of the assessment modules is to determine a learner's comprehension and/or competency in one or more topics being assessed. However, for various reasons, an assessment module may not accurately determine the abilities of some learners. For example, some learners may have trouble using the allocated time to answer all of the questions on a particular assessment. Furthermore, some learners may spend disproportionate amounts of the allocated time on questions that are of relatively low value. Accordingly, it may be useful for an eLearning system to provide an assessment tool that can more accurately assess a learner's ability.

Some systems and methods for providing electronic assessments are described herein. The electronic assessments may be provided as part of an eLearning system or as a stand-alone system that provides electronic assessments. As an example, the electronic assessments described herein are provided by an eLearning system.

Figure 1:
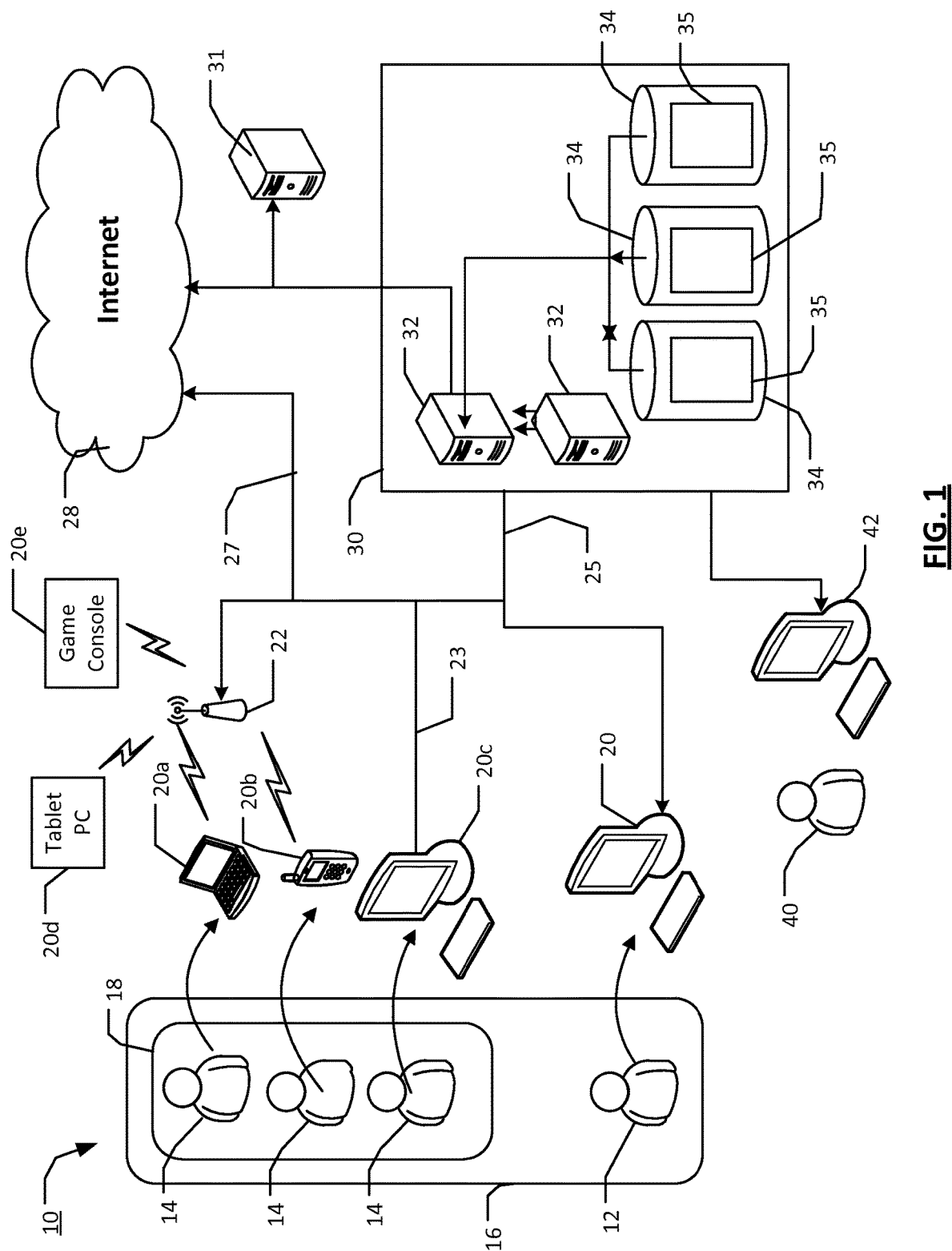
FIG. 1 is a schematic diagram illustrating an eLearning system including electronic assessments according to some embodiments.

Referring now to FIG. 1, illustrated therein is an eLearning system 10 featuring electronic assessments according to some embodiments.

Using the system 10, one or more individuals 12, 14 may communicate with an educational service provider 30 to participate in, create, and consume electronic learning services, including courses and assessment modules. In some embodiments, the educational service provider 30 may be part of or associated with a traditional "bricks and mortar" educational institution (e.g. a grade school, university or college), another entity that provides educational services (e.g., an online university, a company that specializes in offering training courses, or an organization that has a training department), or may be an independent service provider (e.g., for providing individual electronic learning). It should be understood that a course is not limited to formal courses offered by formal educational institutions. The course may include any form of learning instruction offered by an entity of any type. For example, the course may be a training seminar at a company for a small group of employees or a professional certification program with a larger number of intended participants (e.g. PMP, CMA, etc.).

In some embodiments, one or more educational groups can be defined that includes one or more of the individuals 12, 14. For example, as shown in FIG. 1, the individuals 12, 14 may be grouped together in an educational group 16 representative of a particular course (e.g., History 101, French 254), with a first individual 12 or "instructor" or "user" being responsible for providing the course (e.g., organizing lectures, preparing assignments, creating educational content etc.), while the other individuals 14 or "participants" are consumers of the course content (e.g. individuals 14 are enrolled in the course).

In some examples, the individuals 12, 14 may be associated with more than one educational group (e.g., the users 14 may be enrolled in more than one course as participants, the first individual 12 may be enrolled in at least one course as an participant while being responsible for teaching at least one other course as a user, or the first individual 12 may be responsible for teaching more than one courses as a user).

In some embodiments, educational sub-groups may also be formed. For example, three of the individuals 14 are shown as part of educational sub-group 18. The sub-group 18 may be formed in relation to a particular project or assignment (e.g., sub-group 18 may be a lab group) or based on other criteria. In some embodiments, due to the nature of the electronic learning, the individuals 14 in a particular sub-group 18 need not physically meet, but may collaborate together using various tools provided by the educational service provider 30.

In some embodiments, other groups 16 and sub-groups 18 could include individuals 14 that share common interests (e.g., interests in a particular sport), that participate in common activities (e.g., members of a choir or a club), and/or have similar attributes (e.g., individuals that are male, and/or under twenty-one years of age, etc.).

Communication between the individuals 12, 14 and the educational service provider 30 can occur either directly or indirectly using any suitable computing device. For example, the individual 12 may use a computing device 20 such as a desktop computer that has at least one input device (e.g., a keyboard and a mouse) and at least one output device (e.g., a display screen and speakers).

The computing device 20 can generally be any suitable device for facilitating communication between the individual 12, 14 and the educational service provider 30. For example, the computing device 20 could be a laptop 20a wirelessly coupled to an access point 22 (e.g., a wireless router, a cellular communications tower, etc.), a wirelessly enabled personal data assistant (PDA) 20b or smart phone, a terminal 20c, a tablet computer 20d, or a game console 20e over a wired connection 23.

The computing devices 20 may be connected to the service provider 30 via any suitable communications channel. For example, the computing devices 20 may communicate to the educational service provider 30 over a local area network (LAN) or intranet, or using an external network (e.g., by using a browser on the computing device 20 to browse to one or more web pages presented over the Internet 28 over a data connection 27).

In some examples, one or more of the individuals 12, 14 may be required to authenticate their identities in order to communicate with the educational service provider 30. For example, the individuals 12, 14 may be required to input a login name and/or a password or otherwise identify themselves to gain access to the system 10.

In some examples, one or more individuals (e.g., "guest" users or participants) may be able to access the system without authentication. Such guests may be provided with limited access, such as the ability to review one or more components of the course, for example, to decide whether they would like to participate in the course.

In some embodiments, the wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one individual 14 may use a laptop 20a to browse to a webpage that displays elements of an electronic learning system (e.g. a course page).

The educational service provider 30 generally includes a number of functional components for facilitating the provision of social electronic learning services. For example, the educational service provider 30 generally includes one or more processing devices 32 (e.g., servers 32), each having one or more processors. The processing devices 32 are configured to send information (e.g., HTML or other data) to be displayed on one or more computing devices 20 in association with the social electronic learning system 10 (e.g., course information). In some embodiments, a processing device 32 may be a computing device 20 (e.g., a laptop or personal computer).

The educational service provider 30 also generally includes one or more data storage devices 34 (e.g., memory, etc.) that are in communication with the processing devices 32, and could include a relational database (such as a Structured Query Language (SQL) database), or other suitable data storage devices. The data storage devices 34 are configured to host data 35 about the courses offered by the service provider (e.g., the course frameworks, educational materials to be consumed by the individuals 14, records of assessments done by individuals 14, etc.).

The data storage devices 34 may also store authorization criteria that define what actions may be taken by the individuals 12, 14. In some embodiments, the authorization criteria may include at least one security profile associated with at least one role. For example, one role could be defined for individuals who are primarily users responsible for developing an educational course, teaching it, and assessing work product from participants for that course. Users with such a role may have a security profile that allows them to configure various components of the course, post assignments, add assessments, evaluate performance, and so on.

In some embodiments, some of the authorization criteria may be defined by specific individuals 40 who may or may not be part of the educational community 16. For example, individuals 40 may be permitted to administer and/or define global configuration profiles for the system 10, define roles within the system 10, set security profiles associated with the roles, and assign the roles to particular individuals 12, 14 in the system 10. In some embodiments, the individuals 40 may use another computing device (e.g., a desktop computer 42) to accomplish these tasks.

The data storage devices 34 may also be configured to store other information, such as personal information about the individuals 12, 14 of the system 10, information about which courses the individuals 14 are enrolled in, roles to which the individuals 12, 14 are assigned, particular interests of the individuals 12, 14 and so on.

The processing devices 32 and data storage devices 34 may also provide other electronic learning management tools (e.g., allowing individuals to add and drop courses, communicate with other individuals using chat software, etc.), and/or may be in communication with one or more other vendors that provide the tools.

In some embodiments, the system 10 may also have one or more backup servers 31 that may duplicate some or all of the data 35 stored on the data storage devices 34. The backup servers 31 may be desirable for disaster recovery (e.g., to prevent undesired data loss in the event of an event such as a fire, flooding, or theft).

In some embodiments, the backup servers 31 may be directly connected to the educational service provider 30 but located within the system 10 at a different physical location. For example, the backup servers 31 could be located at a remote storage location at a distance from the service provider 30, and the service provider 30 could connect to the backup server 31 using a secure communications protocol to ensure that the confidentiality of the data 35 is maintained.

Figure 2:
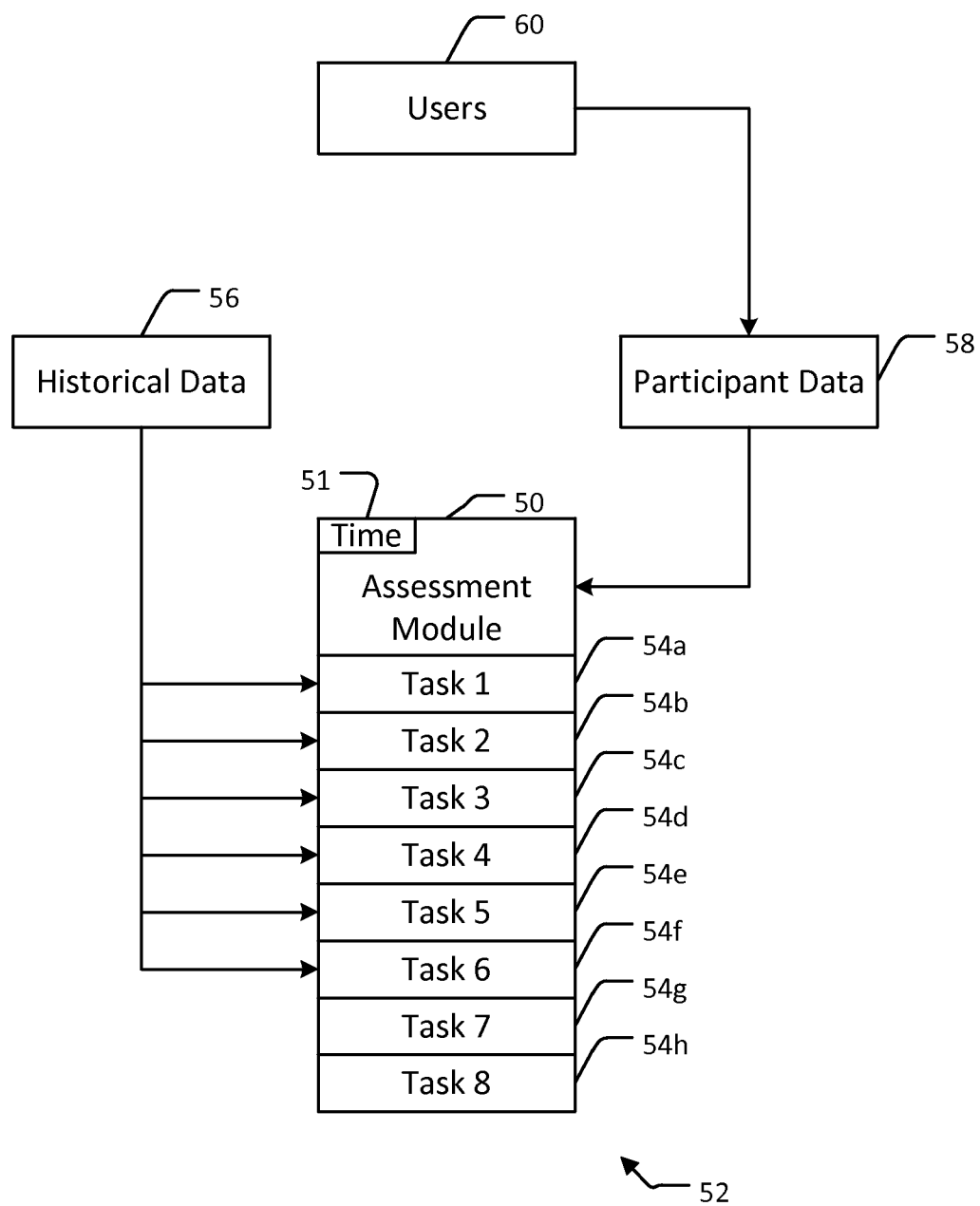
FIG. 2 is a schematic diagram of an exemplary assessment module provided by the system of FIG. 1.

Referring now to FIG. 2, illustrated therein is a schematic diagram illustrating an exemplary assessment module 50 that may be provided by the system 10. For example, the processing devices 32 and/or computing devices 20a-20e may be configured to provide the assessment module 50. The assessment module 50 may be designed and created by a suitable user, such as an instructor 12 of a course. In some cases, the assessment modules and/or the components thereof may be stored in a data storage device (such as the data storage device 34) such that they may be reused in subsequently. For example, many instructors "recycle" multiple choice questions or other questions when creating a quiz, test or an exam.

The users 14 who are participating in the assessment module may be referred to as "participants". The participants of the assessment module may be a subset of the users 14. For example, if the assessment module was associated with a particular class, the learners enrolled in that class (who are a subset of the users 14) may be required to complete the assessment module.

The participants may use one or more of the computing devices 20, 20a-20e, to participate in the assessment module. The computing devices are operatively coupled to a display, whereby the contents of the assessment module may be provided. For example, if one of the participants is using a laptop device 20a to access the assessment module, the contents of the assessment module may be displayed on a display coupled to the laptop.

The assessment module 50 includes a plurality of assessment tasks 52. The assessment tasks 52 could include questions, assignments, and or any other suitable tasks that a participant in the assessment must undertake to demonstrate his/her understanding of the subject matter. For example, the tasks could include multiple choice questions, true or false questions, short answer questions, long answer questions, essay questions, and so on.

In the example as shown, the assessment module includes eight assessment tasks 52 that a participant should attempt to complete, namely, Task 1-Task 8 indicated by reference numerals 54a to 54h respectively. In other assessment modules, there may be a different number of assessment tasks 52.

The eLearning system 10 includes historical data 56 and participant data 58. The historical data 56 and the participant data 58 may be used by the assessment module 50 to provide a more effective time management strategy and/or pace visualization as described herein below. In other embodiments, the learning system may use the historical data 56 without the participant data 58, or the participant data 58 without the historical data 56.

The historical data 56 is data indicative of performance of participants who had previously completed a particular task. For example, one or more of the assessment tasks 52 may have been used in another version of the assessment module 50 that was administered to another group of participants. In such a case, there may be historical data for those assessment tasks.

However, as not all of the assessment tasks may have been previously administered, there may not be historical data 56 available for all of the tasks. In particular, in the example as shown, historical data 56 is available for Tasks 1-6 but it is not available for tasks 7 and 8.

The participant data 58 may include data indicative of the academic abilities of the participant who is currently completing the task. For example, participant data 58 may include information about the participant's grades, standing relative to his or her peers, courses completed, learning modules completed, and so on. The participant data 58 may be obtained from the eLearning system 10 as the system 10 would have relevant participant data 58 from the participant's involvement with the system 10. In some cases, there may not be any participant data 58 available.

Use of the historical data 56 and participant data 58 is described in further detail herein below with reference to FIG. 3.

Generally, each of the assessment modules has an assessment time allocated therefor to complete the assessment module. For example, a relatively short assessment module such as a "quiz" may have 15 minutes to 30 minutes allocated to complete the assessment module, while a relatively longer assessment module such as a "mid-term test" and "final examination" may have 1 to 3 hours allocated to complete the assessment module.

The participants of the assessment module are expected to complete or to attempt as many assessment tasks 52 of the assessment module 50 within the allocated time. The assessment module 50, in the present example has assessment time 51 allocated therewith. The assessment time 51 allocated for completing the tasks 52 in this example is one hour (i.e. 60 minutes).

Assessment participants may deploy various time management strategies to encourage completion of all of the tasks 52 of the assessment module 50. One common strategy is to proportionally allocate an amount of time to spend on each assessment task 52 based upon the value of the assessment task 52. That is, a participant may prorate an amount of time to be spent on each question on an exam based upon the marks allocated to that question. However, this type of strategy may not take into account difficulties associated with each assessment task.

For example, some tasks 52 may be relatively easy and completed relatively quickly, yet be assigned a relatively high value. In contrast, some tasks 52 may have relatively low assigned value, yet be relatively difficult and require a relatively long amount of time to complete. In another example, a participant may have taken too long to answer a subset of the assessment tasks, and thereby has less time to allocate to the remaining assessment tasks. Alternatively, a participant may have completed a subset of the assessment tasks ahead of schedule and thereby have more time to allocate to the remaining tasks.

In one or more of the above examples, it may be desirable to use a different strategy than simple proportionate distribution to allocate time to the remaining assessment tasks.

Figure 3:
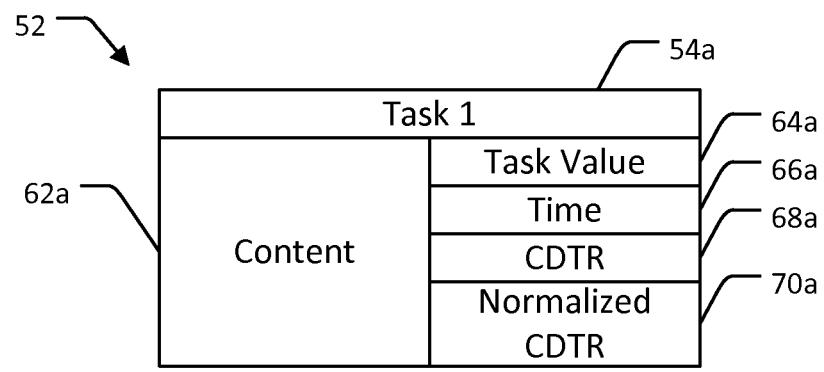
FIG. 3 is a schematic diagram of an assessment task shown in FIG. 2.

Referring now to FIG. 3, illustrated therein is a schematic diagram of exemplary data that may be associated with each of the assessment tasks 52. In the example as shown, the data is associated with the assessment Task 1.

Task 1 generally includes content 62a. The content 62a may include instructions for the participant to execute a task or a question for the participant to answer, for example. As noted above, task content may include multiple choice questions, true-or-false questions, short answer questions, long answer questions, and the like.

Task 1 also has a task value 64a associated therewith. The task value 64a is indicative of the marks assigned to the task. That is, the task value indicates the amount of marks a participant could earn by completing the task successfully. The task value 64a may be marks allocated to the task (e.g. 2 marks, 5 marks, 10 marks, etc.) or a percentage value of the assessment module allocated to the task (e.g. 5%, 10%, 20%, etc.), or some other value.

Task 1 also has a time value 66a associated therewith. The time value 66a is indicative of the length of time allocated to this task as determined by proportionally allocating the overall amount of time 51 allocated to the assessment module 50 based upon the task value 64a associated with this task.

Task 1 also has a context dependent time requirement (hereinafter "CDTR") value associated therewith. The CDTR value is indicative of a suggested amount of time the current participant should spend on the given task.

In some cases, for example for Tasks 7 and 8, there may not be any historical data available. For example, Tasks 7 and 8 may be new to this assessment module 50 and may not have been previously administered. Thus, there may not be any historical data available for these tasks. In such cases, the CDTR value may be assigned the time value 66a.

In some cases, there may be an option for a user (e.g. an instructor) to manually enter a CDTR value. For example, an instructor designing the assessment module 50 may provide a suggested time for a particular task that is different from time value 66a.

The CDTR value may be determined based upon historical data 68a for this task, and in some embodiments, the participant data 58 associated with the current participant.

The historical data 56 may include data indicative of the amount of time required by previous participants to complete this task. This historical time value may be used to determine the CDTR value for the task. For example, historically, if the participants have taken "x" amount of time to complete the task successfully, then the CDTR value for the task may be "x" or a function of "x".

The historical value may be different from the time value 66a, which as described above, is obtained by proportionally allocating the assessment time 51 based upon the task value 64a allocated to the current task. In comparison to the time value 66a, the CDTR determined based upon the historical value may be more accurate as an indicator of the time required to complete the associated task.

In some embodiments, the historical amount of time required may be the historical amount of time required to complete the task successfully. That is, the data may be drawn from previous participants who had successfully completed the task. This may provide a more accurate estimate of the suggested amount of time that the current participant should spend on the task to complete the task successfully, and the CDTR value may not include the data associated with previous test takers who did not complete the task successfully.

In some embodiments, completing a task successfully could be defined as obtaining a successful task value (e.g., a passing grade) for that task. That is, if a participant obtained a successful task value for that task, the participant can be said to have successfully completed that task. The successful task value or grade may be predefined. In some cases, a successful grade could be a value between 50% of the allocated task value to 100% of the allocated task value. For example, if the task is a true or false question, then the successful grade may be 100% (as the alternative would be 0%).

In some embodiments, the system 10 may provide options for the current participant to define the successful grade. For example, a current participant may be presented with an option to define the successful grade for the purposes of CDTR value calculations prior to starting the assessment activity (i.e. prior to starting to attempt the tasks in the assessment module) or during the assessment activity.

In some embodiments, the system 10 may provide options for an instructor or any other suitable user (e.g., an entity creating the assessment module) to define a successful task value.

In some embodiments, the system 10 may automatically define the successful grade based upon historical data 56 associated with the task. For example, the system 10 may define a successful task value based upon the mean, median, or mode values of the grades obtained historically for the task. In another example, a successful grade could be determined based upon standard deviation from the mean value or other suitable value.

The successful grade may be defined by a combination of the above noted methods (i.e. defined by a combination of the participant, instructor/suitable user and the system).

In some embodiments, the CDTR value may be determined based upon the participant data 58 in addition to the historical data 56. The participant data 58 may be used to locate historical data associated with historical participants who are similar to the current participant. That is, a subset of the historical data for historical participants that are similar in academic ability to the current participant may be used to determine the CDTR values. For example, participant data 58 associated with the current participant may be used to determine academically similar historical participants who have similar academic abilities as compared to the current participant.

In some cases, academic similarity could be determined based upon data associated with grades obtained, courses completed, and so on. After identifying similar historical participants, historical data associated with these participants may be obtained.

The historical data associated with the academically similar previous participants could then be used, either standalone or in combination with other historical data, to determine the CDTR value. For example, the CDTR value may be determined based upon the historical data associated with academically similar previous participants, and without regard to the historical data associated with other (e.g., dissimilar) previous participants.

In another example, historical data associated with academically similar previous participants may be weighted differently in comparison to the historical data associated with other (e.g., dissimilar) participants.

Using historical data associated with similar historical participants may provide a more accurate prediction of the time that the current participant may require to complete the associated task.

In some embodiments, the CDTR value may be adjusted based upon historical success rate indicative of the percentage of the previous participants who have obtained the successful grade or another defined grade for the task. This may allow the CDTR value to be adjusted to account for the overall difficulty level of the task. For example, if a significant percentage of previous participants do not successfully complete the task, then it may be appropriate to provide additional time to complete task.

In some embodiments, the CDTR value for a task k may be determined based upon the following equation:

$$CDTR(k)=T(k)/S(k)$$

wherein $T(k)$ is the time taken by similar previous participants to successfully complete the task and $S(k)$ is a real number representing a percentage of the participants who had successfully completed the task. It should be understood that the above equation illustrates an exemplary way of calculating the CDTR value. In other embodiments, other suitable way for calculating the CDTR value may be used.

In addition to the CDTR value, the Task 1 also has a normalized CDTR value 70a associated therewith. The normalized CDTR value 70a is indicative of the suggested amount of time the current participant should spend on the given task, taking into account the time remaining for the assessment module.

The normalized CDTR value is determined based upon the sum of CDTR values associated with the remaining tasks and the amount of assessment time, or the amount of assessment time currently remaining. For example, if the combined CDTR values for assessment tasks at the beginning of the assessment module is 120 minutes and the assessment time for an assessment module is 180 minutes, the normalized CDTR value may be obtained by multiplying each CDTR value with 180/120 (i.e. 3/2). In another example, assuming that the total CDTR values for remaining tasks is 60 minutes and the remaining assessment time is 30 minutes, the normalized CDTR value may be obtained by multiplying each CDTR value with 30/60 (i.e. 1/2).

If the normalized CDTR value is determined based upon the sum of the CDTR values and the remaining time, the normalized CDTR value may be dynamically updated to account for changes in the CDTR values or the remaining time. In one example, the normalized CDTR value may be updated each time an activity that changes the CDTR values is executed. For example, if a task is completed or the participant has indicated that the task will not be performed (i.e. blacklisted) then the normalized CDTR value for the tasks may be recalculated to account for the change in the sum of CDTR values. In another example, the normalized CDTR values may be recalculated periodically to account for the change in remaining time. In yet another example, the normalized CDTR values may be recalculated when requested by the current participant.

In some embodiments, a pace visualization generated based upon the CDTR values may be provided to the participants. Referring now to FIGS. 4-8, illustrated therein are some exemplary pace visualizations that may be generated for the assessment module 50 that may be provided to the participants. Each of the FIGS. 4-8 illustrates various levels of progress by a participant in the assessment module. For example, FIG. 4 may be illustrative of a visualization at the start of the assessment module, where the participant has not completed any assessment tasks.

Figure 5:
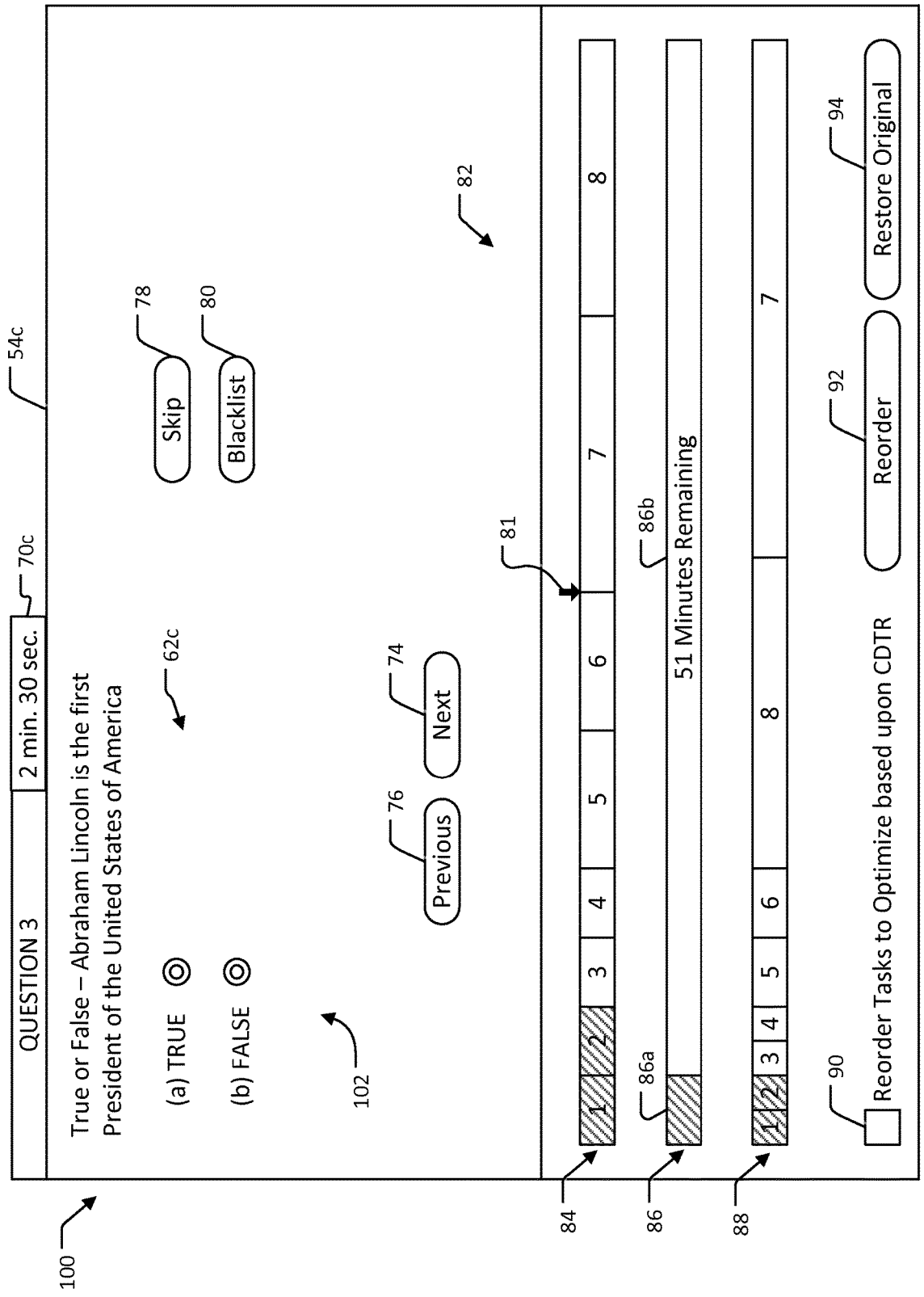
FIG. 5 is a schematic diagram of the visualization shown in FIG. 4 for another one of the assessment tasks shown in FIG. 2.

In FIG. 5, the participant has completed Task 1 and Task 2 and is now being presented Task 3.

Figure 6:
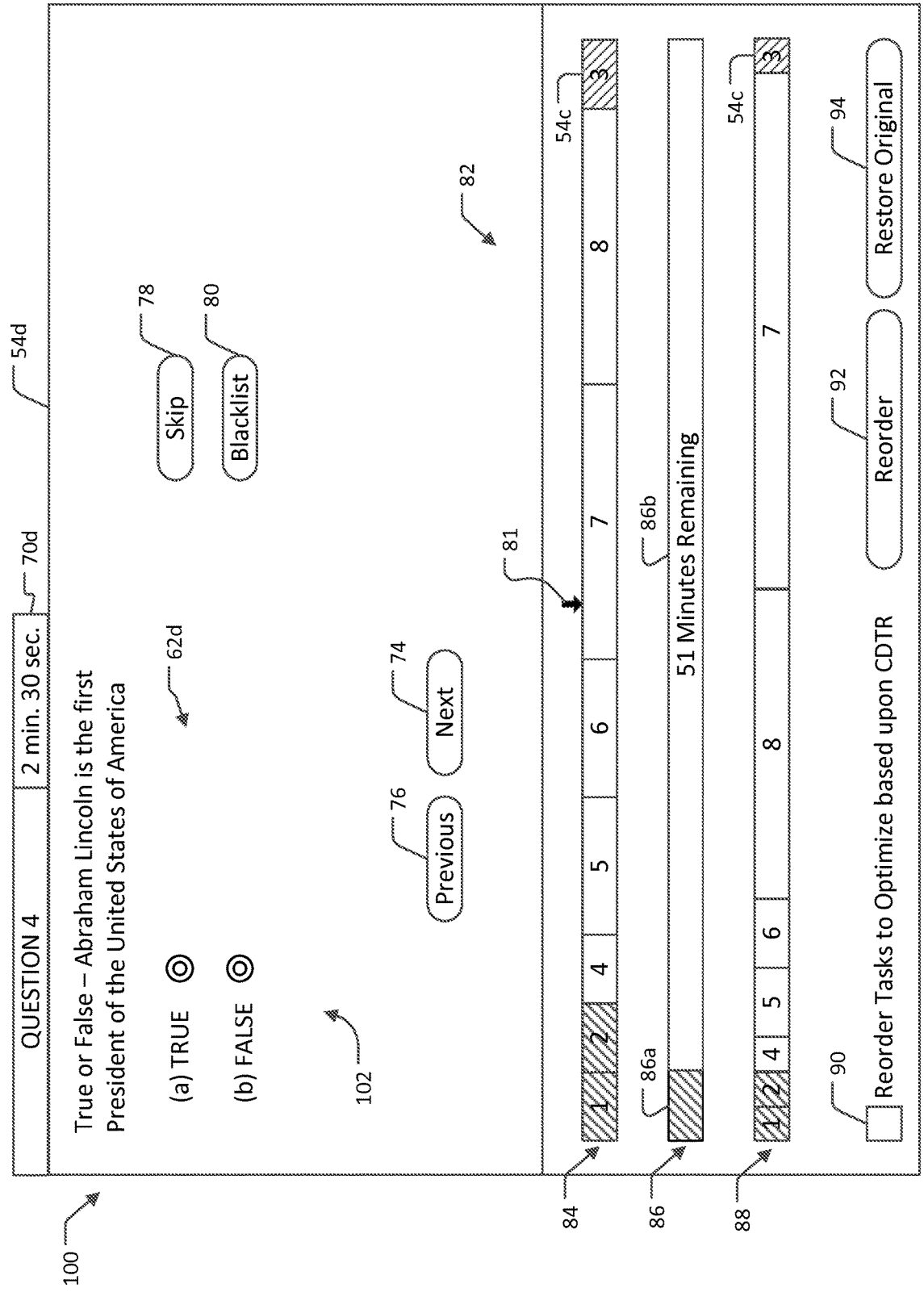
FIG. 6 is a schematic diagram of the visualization shown in FIG. 4 after one of the tasks is skipped.

In FIG. 6, the participant has skipped Task 3 and now being presented with Task 4.

Figure 7:
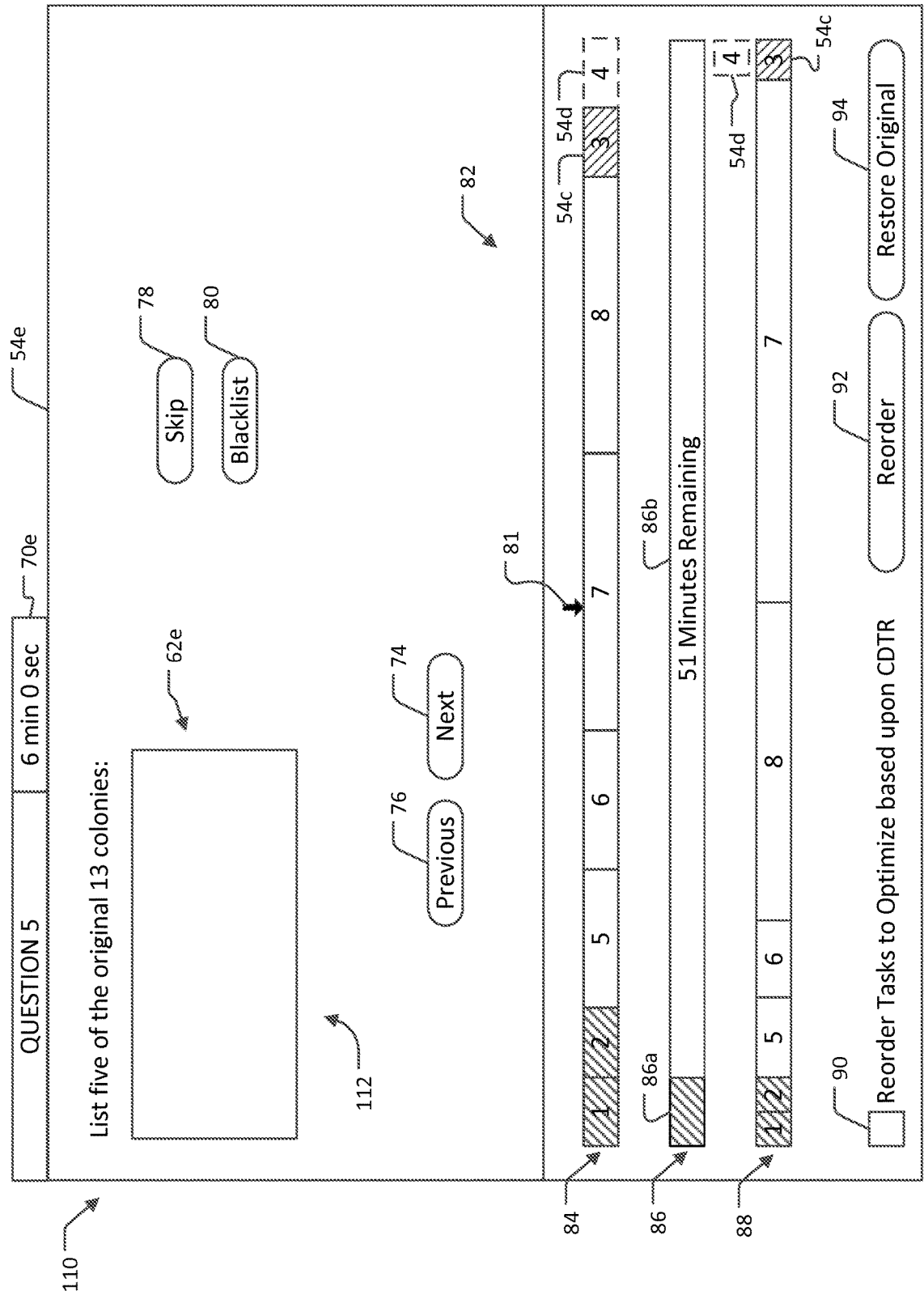
FIG. 7 is a schematic diagram of the visualization shown in FIG. 4 after one of the tasks is blacklisted.

In FIG. 7, the participant has blacklisted Task 4 and now being presented with Task 5.

The FIGS. 8A-8C illustrates exemplary reordering of tasks based upon CDTR values.

Figure 4:
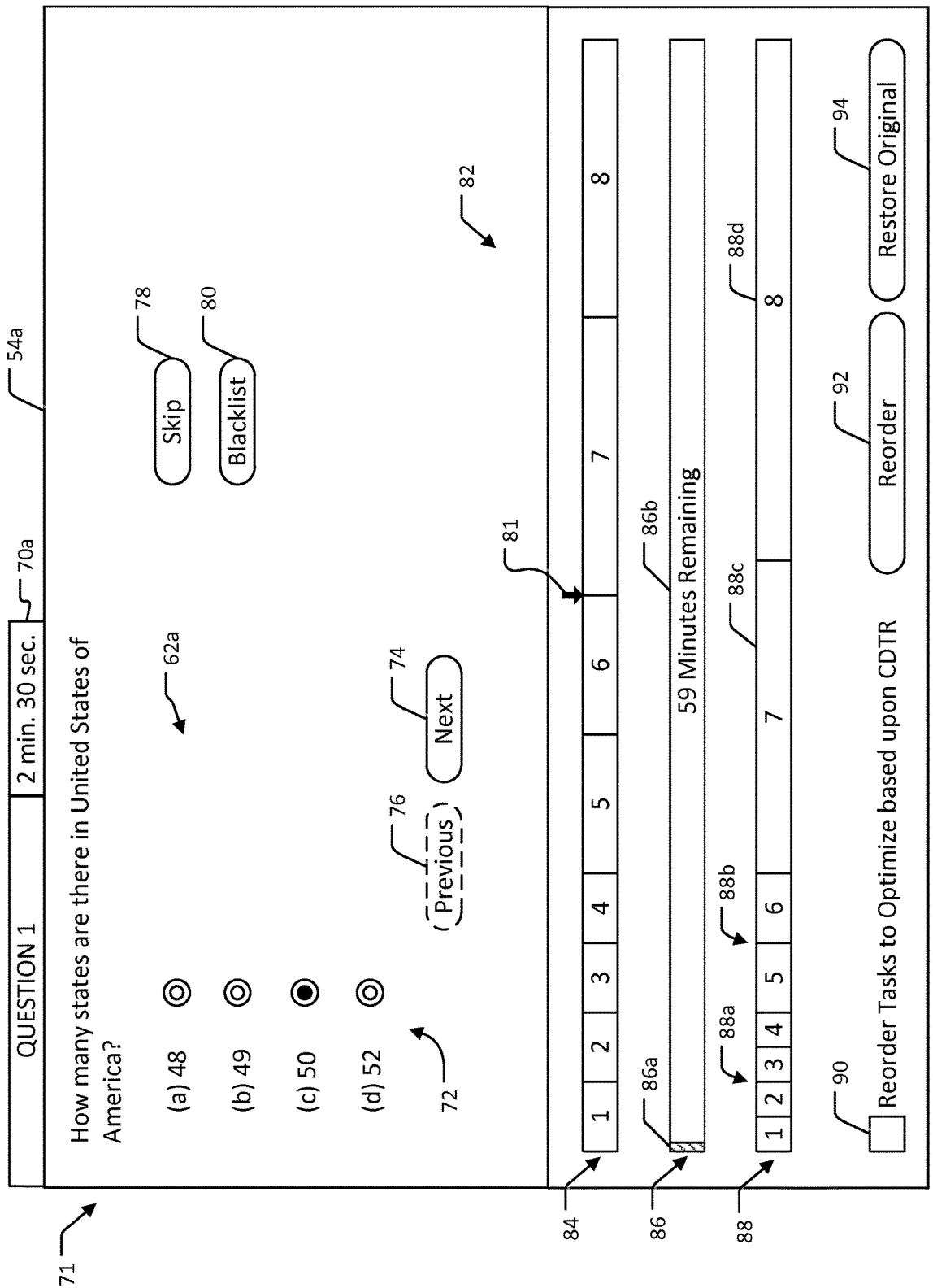
FIG. 4 is a schematic diagram of an exemplary visualization for one of the assessment tasks shown in FIG. 2.

Referring now specifically to FIG. 4, illustrated therein is a visualization 71 that may be displayed on a display device for a current participant. For example, the visualization 71 may be web page viewable via a laptop for a current participant. The visualization 71 as shown in FIG. 4 is associated with the task 54a (i.e. Task 1).

The visualization 71 includes the content 62a associated with the task 54a. The content 64a, in this case, is a multiple choice question. The participant may select one of the answers 72 to answer the question.

The visualization 71 also displays the normalized CDTR value 70a associated with the task, which in this case is two minutes and thirty seconds. This indicates that the participant should complete this task within that time. The CDTR value 70a may also be displayed as a countdown timer so that the current participant may determine at a glance the time remaining to complete the task.

The visualization 71 also includes a number of control options, namely a "Previous" button 76, a "Next" button 74, a "Skip" button 78 and a "Blacklist" button 80.

Since this is the first task in the assessment module, the "Previous" button 76 is shown using stippled lines (e.g., greyed out) so as to indicate that this option is currently not available.

The "Next" button 74, when activated (i.e. clicked or otherwise selected using a pointing device) would advance to another task. The next task may be a task that is one task subsequent to the current task (e.g. Task 2) if the tasks are presented in order (i.e. from Task 1 to Task 8). Alternatively, the next task may be a task that is next of the sequence of tasks that are rearranged based upon CDTR values.

The "Skip" button 78 allows the current participant to skip the current assessment task with the expectation that the task may be attempted again at a later timer. When the Skip button 78 is activated to temporary skip the task, the CDTR value associated with the task remains in sum of the total CDTR values for the remaining tasks when determining normalized CDTR values. An exemplary operation of the Skip button is described herein below with reference to FIG. 6.

In contrast, the "Blacklist" button 80 allows the current participant to indicate that the task will not be attempted during the assessment. That is, the participant has effectively "given up" on that question. In this case, the CDTR value associated with this task will not be counted in sum of the total CDTR values for the remaining tasks when determining normalized CDTR values. An exemplary operation of the Blacklist button 80 is described herein below with reference to FIG. 7.

The visualization 71 also includes a pace visualization portion 82. The pace visualization portion 82 displays various data associated with the assessment module 50 and the current task 54a to a participant. The bar graph 84 displays the assessment tasks. As the assessment module 50 includes eight tasks, eight tasks are shown. Furthermore, the size of each task on the graph 84 is proportional to the task value associated with that task. That is, each of the Tasks 1-4 is worth half of Task 5 or Task 6, and each of the Tasks 5 and 6 is worth half of Task 7 or Task 8. This may allow a participant to determine relative value of each task to other tasks efficiently.

The success indicator 81 indicates the amount of tasks values that the participant must acquire to be successful in the assessment module. For example, the participant may need 50% or 60% of all given marks to pass an exam.

A second bar graph 86 indicative the amount of time remaining for the assessment module is also presented. This value is derived from the assessment time 51. In the current example, the assessment time is set at 60 minutes and as the assessment is just beginning, there are 59 minutes remaining. The portion 86a of the bar graph 86 indicates the elapsed time and the portion 86b of the bar graph 86 indicates time remaining to complete the assessment module.

A third bar graph 88 displays the tasks in the assessment module similar to the graph 84. However, in the graph 88, the size of each task on the graph 88 is proportional to the normalized CDTR value associated with that task. The graph 88 may allow the candidate to determine the amount of time suggested to complete the tasks successfully. As shown, the normalized CDTR value for task 1 is less the task time 66a for the same task. This could be indicative of the difficulty of the question—i.e. it is possible to spend less than the allocated task time for this question to be successful. This allows the participant to identify the tasks that he/she can complete relatively quickly and other tasks that would require more time to complete successfully. For example, the participant may spend less time on multiple-choice and/or true-false questions so that he/she can spend more time on long answer questions.

It should be understood that in other embodiments, other suitable types of visualizations other than the bar graphs may be used to display the normalized CDTR values associated with the tasks. Furthermore, remaining assessment time may be provided along with the normalized CDTR values such that the participant may determine whether if he/she is ahead or falling behind. This may allow the participants to adjust their efforts or strategy to improve their performance in the assessment module.

In the embodiment as shown, the CDTR graph 88 and the Time Remaining graph 86 cooperate to allow the participant to determine how he/she is doing time-wise. For example, in FIG. 5, the participant could observe that he/she is right on schedule since the elapsed time portion 86a and the completed questions indicated by 88a are generally at the same point. Using the normalized CDTR value also allows the participant to obtain a more accurate measure of the current status. For example, if the participant views graph 84 in comparison to graph 86, he/she may think that she is ahead of schedule since she has completed two questions in less than the time allocated for those questions. However, this view may not be accurate because other questions (e.g. questions 7 and 8) may require more time to be successful.

As noted above, the participant is given an opportunity to skip a question by clicking on the "Skip" command 78. The participant may wish to use this command 78 when he or she doesn't know the answer to the question presently, but would like to come back to it at a later time. For example, the participant may wish to skip question 3 (i.e. Task 54c) shown in FIG. 5 by clicking on the skip button 74. When this question is skipped, the question is placed at the end of the graph 84 and 88 as shown in FIG. 6. This allows the participant to visualize the skipped question. The skipped questions may also be shaded differently or otherwise identified visually.

In some embodiments, the bar graphs 84 and 86 may also function as a menu or an index for the participants to access various tasks. For example, the participant may click on each of the questions to load the question. This allows the participant to quickly return to a previous question to change an answer or to attempt questions out of sequence. The participant may also use this feature to re-attempt question 3 when he/she is ready (e.g. the participant may have remembered the answer while attempting another question).

As shown, the skipped question is placed at the end of the sequence of tasks. The CDTR value for the question remain as part of the total CDTR values to determine the normalized CDTR values since by skipping this task, the participant is indicating that he/she wishes to re-attempt this task at a later time.

In contrast to the Skip command 78, when the Blacklist command 80 is activated, the task is removed from the pool of remaining tasks and the associated CDTR value is removed from the pool. For example, the participant may wish to blacklist Question 4 (Task 54*d*) by clicking on the Blacklist button 80. As shown in FIG. 7, blacklisting question 4 cause it to be removed from the graph 88. The question is also removed from the graph 84 and placed at the end. The removed task may be shown using faded colours or other suitable visual indication as indicated by the stippled lines.

As the CDTR value for the question is removed from the sum of CDTR values used for calculating normalized CDTR values, the normalized CDTR values for the remaining tasks increases, as there is now more time to complete the remaining tasks.

Similar to the skipped task, if the participant changes his/her mind about attempting this task, the participant may click on question 4 shown in FIG. 7 to re-attempt it.

In some embodiments, a task re-ordering function may also be provided. For example, the Participant may access the reordering functionality by using a "Reorder" command button 92. This will cause the tasks to be reordered to attempt to maximize the performance of the participant by rearranging the order of tasks to be performed.

The tasks in the assessment module may be rearranged based upon the normalized CDTR and the task value associated each task. For example, a profit value for each task may be calculated. The profit value may be a function of the task value (i.e. potential income) and the CDTR value (i.e. cost of obtaining the income). The tasks may be rearranged based upon their profitability.

In another example, the problem of optimizing the tasks may be viewed as solving a combinatorial optimization problem, which may be generally referred to as the "knapsack problem". That is, given a set of remaining tasks, each task being associated with a cost (i.e., a CDTR for that task) and a task value, determine the tasks that should be performed so that the total cost is less than or equal to the remaining assessment time.

Any suitable solution to the knapsack problem may be implemented to optimize the remaining tasks. In some cases, to save processing resources, a fully polynomial time approximation scheme may be used to provide a suitable solution.

Referring now to FIG. 8A, illustrated therein are the graphs 86 and 88 for a set of tasks from another exemplary assessment module. As can be observed, the current participant is falling behind and may not have sufficient time to complete all of the remaining tasks. That is, the participant needs to complete tasks 4, 5 and 8, which would likely require approximately 28 minutes, but only has 15 minutes remaining. In this case, the participant may click on the Reorder button 92 to reorder the tasks to attempt to optimize the marks earned for the remaining tasks. As shown in FIG. 8B, when the Reorder button is activated, the tasks are reordered such that Task 4 is now removed from the sequence of remaining tasks to be completed, for example as a result of solving the knapsack problem above. This allows the participant to complete remaining tasks. Should the participant complete the reordered tasks ahead of schedule, the participant may attempt Task 4 at a later time. For example, if the participant completes Task 5 in a single minute, then Task 4 may be re-added to the sequence as shown in FIG. 8C.

In some cases, reordering may be done without requiring input from the participant.

In some cases, a check box 90 may be provided as shown in FIGS. 4-7. The check box 90 may be used to reorder to optimized as described above each time a task is advanced (e.g. by pressing Next button 74, Previous button 76, Skip button 78, or Blacklist button 80). For example, if the box is checked when the participant completes Task 5 in FIG. 8B, Task 4 might be automatically relisted into the sequence as the participant advances through to the next task.

Figure 9:
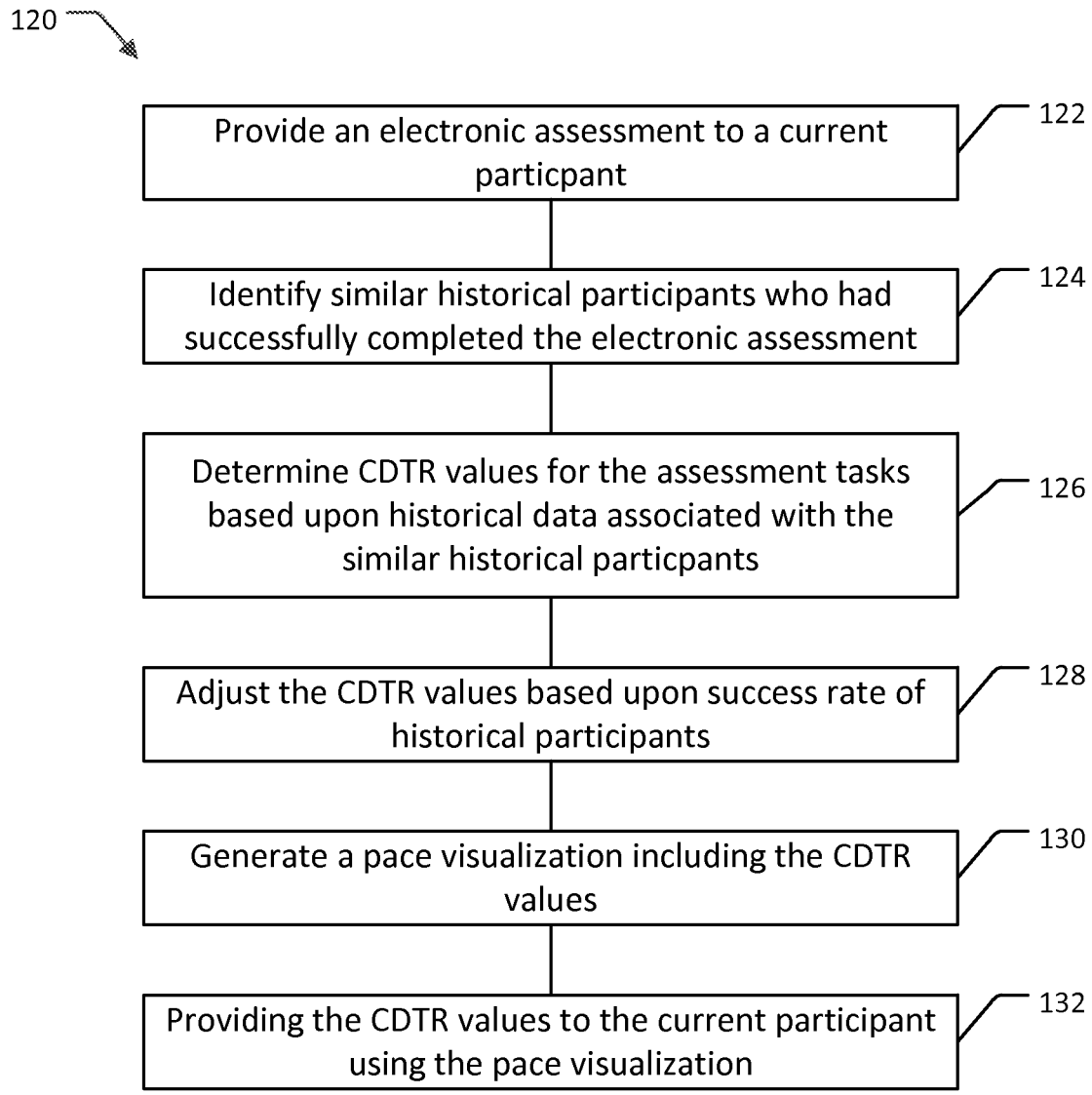
FIG. 9 is a schematic diagram illustrating steps of a method for conducting electronic assessments according to some embodiments.

Referring now to FIG. 9, illustrated therein is a method 120 for conducting an electronic assessment according to some embodiments. The method may be executed by one or more of the processors of an eLearning system.

The method starts at step 122 wherein an electronic assessment provided. The assessment, for example may be similar to the assessment module 50 shown in FIG. 2. The assessment module include a plurality of assessment tasks for a current participant to complete and assessment time indicative of the time allocated to the participants to complete the assessment.

At step 124, similar historical participants who had successfully completed the electronic assessment are identified.

At step 126, context-dependent time requirement (CDTR) value for at least one of the assessment tasks is determined using at least one processor. The CDTR value is determined based upon historical performance data associated with that task and being indicative of a suggested amount of time required to complete that task. In some cases, the CDTR value may be normalized based upon the amount of time remaining. In some cases, the CDTR value may be the CDTR values that were normalized based upon assessment time.

At step 128, the CDTR values are adjusted based upon success rate of historical participants.

At step 130, a pace visualization including the CDTR values is generated.

At step 132, the CDTR value is provided to the current participant who is completing the assessment. In some embodiments, a visualization that includes the CDTR value may be generated.

It should be understood that the method 120 provided above is only for illustrative purposes. One or more steps may be added to, omitted from, and/or performed in a different manner in other embodiments.

Using CDTR values and providing pace visualization may allow the participants to achieve higher results in assessment modules. These results may more accurately indicate the participant's ability Furthermore, the CDTR values may also allow instructors or any other user who design the assessment module to assess difficulty of the assessment module. For example, if the CDTR values for all of the tasks in the module is greater than the assessment time allocated for the tasks, this could indicate that the participants may not have sufficient time to successfully complete the tasks in the assessment module. In such a case, the instructor may wish to reduce the number tasks or increase the assessment time.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices, in known fashion.

Each program may be implemented in a high level procedural or object oriented programming or scripting language, or both, to communicate with a computer system. Alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, this description and the drawings are not to be considered as limiting the scope of the embodiments described herein in any way, but rather as merely describing the implementation of the various embodiments described herein.

The invention claimed is:

1. An electronic learning system for conducting an electronic assessment, the system comprising:
   a. a display;
   b. at least one processor operatively coupled to the display; and
   c. a memory device coupled to the at least one processor, wherein the memory device includes an application that when executed by the processor causes the at least one processor to:
      i. provide an electronic assessment comprising a plurality of assessment tasks for a current participant to complete within an allocated amount of assessment time;
      ii. determine context-dependent time requirement indicator (CDTR) for one of the assessment tasks of the assessment, wherein the CDTR is determined based upon historical performance data associated with that task, the CDTR being indicative of a suggested amount of time required to complete that task, wherein the historical performance data associated with the task corresponds to historical performance data associated with one or more historical participants determined to be similar to the current participant, wherein the one or more historical participants determined to be similar to the current participant are determined based at least in part on one or more academic characteristics of the one or more historical participants including grade information associated with the one or more historical participants, and wherein the one or more historical participants determined to be similar to the current participant is a subset of all participants for which historical performance data exists; and
      iii. provide the CDTR to the current participant contemporaneously with the electronic assessment, wherein the CDTR is provided on a user interface used in connection with providing the electronic assessment to the current user,
      wherein the CDTR is dynamically updated based at least in part on a remaining amount of time of the allocated amount of assessment time and on one or more remaining assessment tasks; and
      wherein the at least one processor is further configured to:
         iv) determine a suggested order of performance for remaining tasks of the plurality of assessment tasks to optimize the participant's performance, the suggested order being determined based upon CDTR and task value associated with the remaining tasks and remaining time of the assessment time; and
         v) automatically display the suggested order of performance for remaining tasks on the display.

2. The system of claim 1, wherein the historical performance data for the one of the assessment tasks include data indicative of the amount of time required for historical participants to complete that task and obtain a defined successful task value for that task.

3. The system of claim 2, wherein the successful task value is defined automatically based upon the historical performance data.

4. The system of claim 1, wherein the one or more similar historical participants are identified based upon the academic performance of the current participant and historical participant in at least one other assessment module.

5. The system of claim 1, wherein the CDTR is adjusted based upon success rate of historical participants associated with the one of the assessment tasks, the success rate being indicative of a portion of historical participants who had obtained the successful task value for that task.

6. The system of claim 5, wherein the CDTR comprises a value for a task k determined according to:

$$CDTR(k)=T(k)/S(k)$$

wherein T(k) is the amount of time required for historical participants to complete that task and obtain a defined successful task value for that task, and S(k) is the success rate for that task.

7. The system of claim 1, wherein a normalized CDTR is determined based upon the CDTR and the assessment time.

8. The system of claim 1, wherein the at least one processor is configured to provide a pace visualization including a visual representation of the CDTR and the assessment time.

9. A method for conducting an electronic assessment, the method comprising:
  (a) providing an electronic assessment comprising a plurality of assessment tasks for a current participant to complete within an allocated amount of assessment time;
  (b) determining context-dependent time requirement indicator (CDTR) using at least one processor for one of the assessment tasks based upon historical performance data associated with that task, the CDTR being indicative of a suggested amount of time required to complete that task, wherein the historical performance data associated with the task corresponds to historical performance data associated with one or more historical participants determined to be similar to the current participant, wherein the one or more historical participants determined to be similar to the current participant are determined based at least in part on one or more academic characteristics of the one or more historical participants including grade information associated with the one or more historical participants, and wherein the one or more historical participants determined to be similar to the current participant is a subset of all participants for which historical performance data exists; and
  (c) providing the CDTR to the current participant contemporaneously with the electronic assessment, wherein the CDTR is provided on a user interface used in connection with providing the electronic assessment to the current user,
  wherein the CDTR is dynamically updated based at least in part on a remaining amount of time of the allocated amount of assessment time and on one or more remaining assessment tasks, and further comprising:
  (d) determining a suggested order of performance for remaining tasks of the plurality of assessment tasks to optimize the participant's performance, the suggested order being determined based upon CDTR and task value associated with the remaining tasks and remaining time of the assessment time; and
  (e) automatically displaying the suggested order of performance for remaining tasks on a display.

10. The method of claim 9, wherein the historical performance data for the one of the assessment tasks include data indicative of the amount of time required for historical participants to complete that task and obtain a defined successful task value for that task.

11. The method of claim 10, wherein the method further comprises defining the successful task value automatically based upon the historical performance data.

12. The method of claim 9, further comprising identifying the one or more similar historical participants based upon the academic performance of the current participant and historical participant in at least one other assessment module.

13. The method of claim 9, further comprising adjusting the CDTR based upon success rate of historical participants associated with the one of the assessment tasks, the success rate being indicative of a portion of historical participants who had obtained the successful task value for that task.

14. The method of claim 13, wherein the CDTR comprises a value for a task k determined according to:

$$CDTR(k)=T(k)/S(k)$$

wherein T(k) is the amount of time required for historical participants to complete that task and obtain a defined successful task value for that task, and S(k) is the success rate for that task.

15. The method of claim 9, further comprising determining a normalized CDTR based upon the CDTR and the assessment time.

16. The method of claim 9, further comprising providing a pace visualization including a visual representation of the CDTR and the assessment time.

17. The system of claim 1, wherein the at least one processor is further configured to receive an indication associated with a particular one of the one of the assessment tasks, wherein the indication corresponds to a request to exclude the particular assessment task from determination of the CDTR, and in response to receiving the indication, updating the determination of the CDTR so as to exclude the particular assessment task.

18. The method of claim 9, further comprising:
  receiving an indication associated with a particular one of the one of the assessment tasks, wherein the indication corresponds to a request to exclude the particular assessment task from determination of the CDTR; and
  in response to receiving the indication, updating the determination of the CDTR so as to exclude the particular assessment task.

19. The system of claim 1, wherein the at least one processor is further configured to receive a selection of a level of success with respect to which the CDTR is to be determined, and wherein the determining the CDTR is based at least in part on the selected level of success.

* * * * *